(12) United States Patent
Chen

(10) Patent No.: US 7,775,202 B2
(45) Date of Patent: Aug. 17, 2010

(54) HOLDING CONSTRUCTION OF BARBECUE STOVE

(75) Inventor: Jan-Nan Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 95 days.

(21) Appl. No.: 12/018,244

(22) Filed: Jan. 23, 2008

(65) Prior Publication Data

US 2009/0183727 A1      Jul. 23, 2009

(51) Int. Cl.
*A47J 37/00*      (2006.01)
*F24B 3/00*       (2006.01)

(52) U.S. Cl. .................. 126/25 R; 126/30; 126/38; 126/39 R; 126/50; 99/397; 99/372; 99/375

(58) Field of Classification Search .................. 126/30, 126/38, 39 R, 41 R, 50, 40, 25 R; 99/395, 99/396, 397, 372, 375–380, 389, 391, 400; 16/277, 285, 286, 319, 343, 344; 403/154, 403/155, 150, 151
See application file for complete search history.

(56) References Cited

U.S. PATENT DOCUMENTS

| 2,397,766 | A | * | 4/1946 | Tullis ........................... 126/38 |
| 2,474,043 | A | * | 6/1949 | Etches ......................... 126/9 R |
| 2,556,365 | A | * | 6/1951 | McKnight, Jr. .............. 126/9 R |
| 3,182,585 | A | * | 5/1965 | Rensch et al. .................. 99/340 |
| 3,895,622 | A | * | 7/1975 | Krueger ......................... 126/38 |
| 4,385,619 | A | * | 5/1983 | Casinelli ...................... 126/9 B |
| 4,934,638 | A | * | 6/1990 | Davis ........................... 248/164 |
| 5,452,501 | A | * | 9/1995 | Kramer et al. ................. 29/11 |
| 5,566,606 | A | * | 10/1996 | Johnston ...................... 99/446 |
| 6,315,253 | B1 | * | 11/2001 | Dicke et al. ............... 248/188.7 |
| 6,526,873 | B2 | * | 3/2003 | Brady ........................... 99/332 |
| 6,776,085 | B1 | * | 8/2004 | Tang ............................. 99/375 |
| 6,793,191 | B1 | * | 9/2004 | Williams et al. ............ 248/624 |
| 7,438,071 | B2 | * | 10/2008 | Johnson et al. ............. 126/25 R |
| 2006/0180139 | A1 | * | 8/2006 | Proffitt et al. .............. 126/25 R |
| 2008/0072543 | A1 | * | 3/2008 | Watson et al. .................. 53/441 |

FOREIGN PATENT DOCUMENTS

GB       2440340 A   *  1/2008
TW       M 282630      12/2005

* cited by examiner

*Primary Examiner*—Kenneth B Rinehart
*Assistant Examiner*—Daniel A Bernstein
(74) *Attorney, Agent, or Firm*—Alan Kamrath; Kamrath & Associates PA

(57) ABSTRACT

A barbecue stove includes a body with a hole and a grease plate. The hole is formed on the bottom of the body. The body further includes a frame around the hole and secured with the body. A receive space is formed between the frame and the bottom of the body for receiving the grease plate. A plurality of pivots are fixed on the bottom of the body. Two feet are pivotally connected with the pivots individually. The grease plate includes a bent portion. When the barbecue stove is in use, the grease plate can be mounted on the frame by the bent portion. When the barbecue stove is not in use, the grease plate can be locked by the feet.

10 Claims, 10 Drawing Sheets

HOLDING CONSTRUCTION OF BARBECUE STOVE

BACKGROUND OF INVENTION

1. Field of Invention

The present invention relates to a barbecue stove.

2. Related Prior Art

A barbecue stove has been disclosed in Taiwanese Patent M282630. The barbecue stove includes a body with a base, a supporter, an oil tank and a roast plate. The base includes a receive portion for fixing a heater, and a ridge is provided along the edge of the oil tank. A supporter is used for supporting the oil tank. The oil tank includes a leading portion toward the body and connected with the supporter, and the edge of the leading portion furthermore includes a flange. The roast plate is mounted on the receive portion.

The oil tank will collect the oil when the barbecue stove is used with the roast plate, so the oil tank of the barbecue stove is only suitable for use with the roast plate without any apertures.

The present invention is therefore intended to obviate or at least alleviate the problems encountered in the prior art.

SUMMARY OF INVENTION

According to the present invention, a barbecue stove includes a body with a hole and a grease plate. The hole is formed on the bottom of the body. The body further includes a frame disposed round around the hole and secured with the body. A receive space is formed between the frame and the bottom of the body for receiving the grease plate. A plurality of pivots are fixed on the bottom of the body. Two feet are pivotally connected with the pivots individually. The grease plate includes a bent portion extending radially outward thereof. When the barbecue stove is in use, the grease plate can be mounted on the frame by the bent portion. When the barbecue stove is not in use, the grease plate can be locked by the feet.

An advantage of the barbecue stove according to the present invention is it is suitable for the roast plate with apertures.

Another advantage of the barbecue stove according to the present invention is it is firm and portable, and the grease plate will not come away from barbecue stove.

Other advantages, objectives and features of the present invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
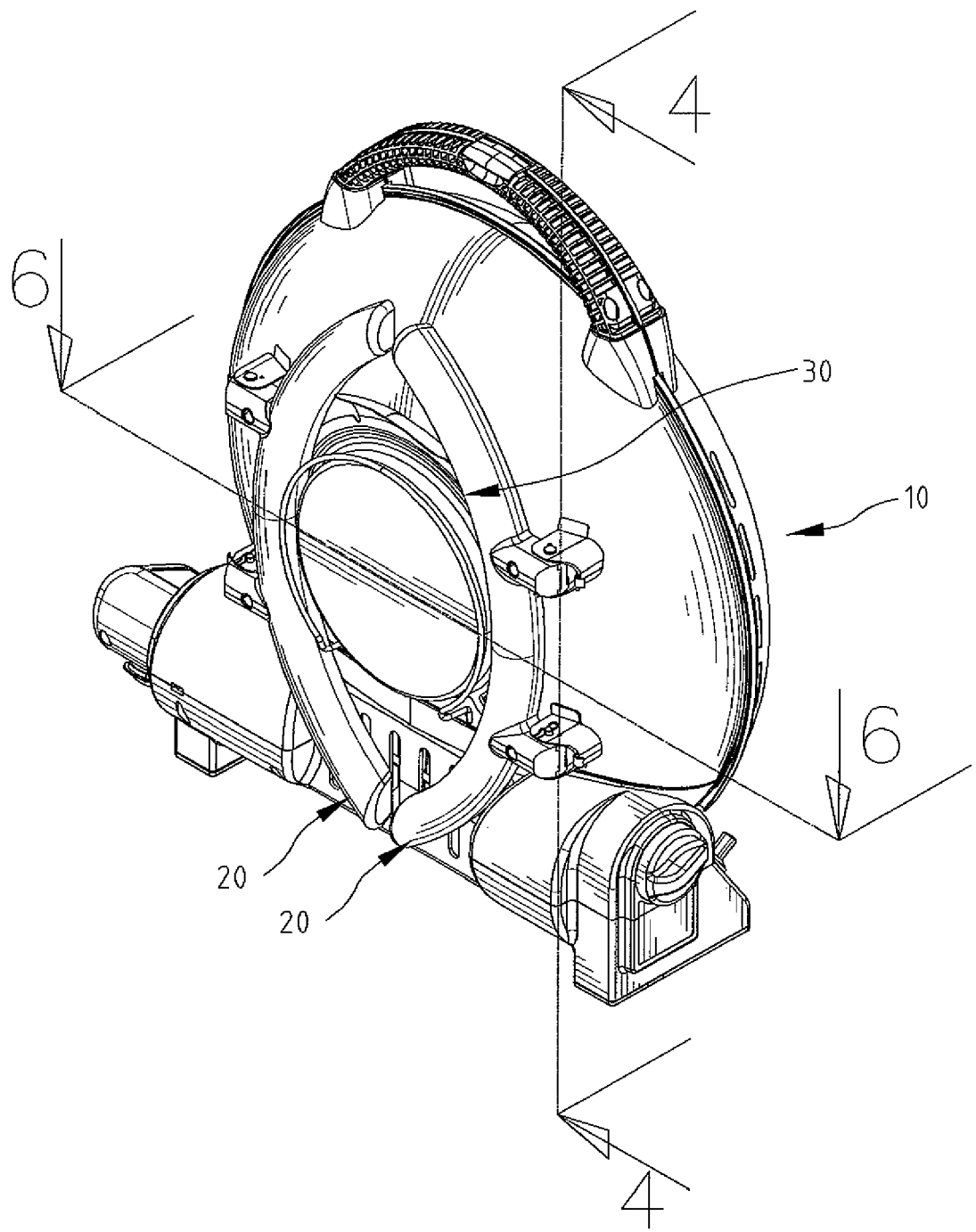
FIG. 1 is a perspective view of a barbecue stove according to the preferred embodiment of the present invention.
Figure 2:
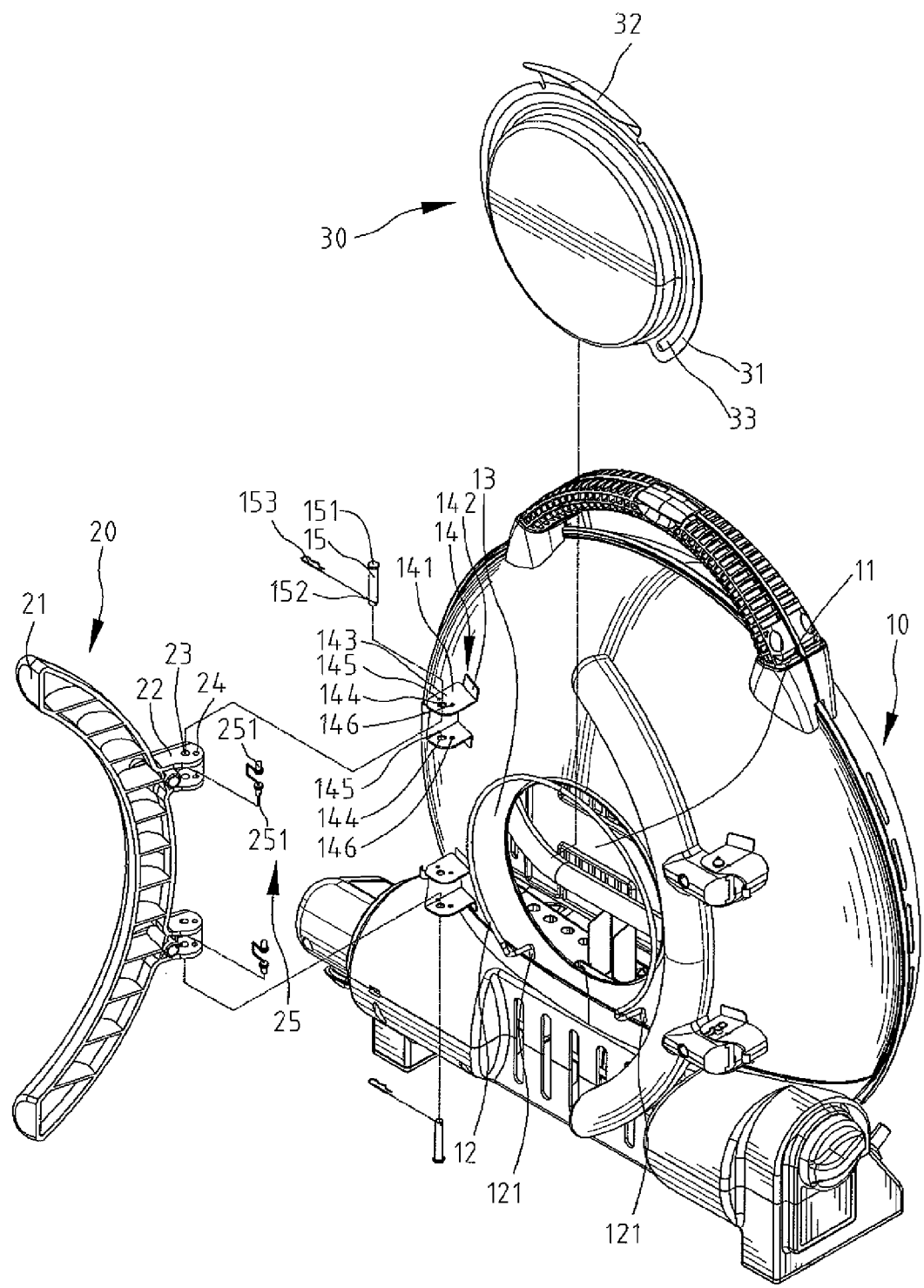
FIG. 2 is a partial exploded view of the barbecue stove shown in FIG. 1.
Figure 3:
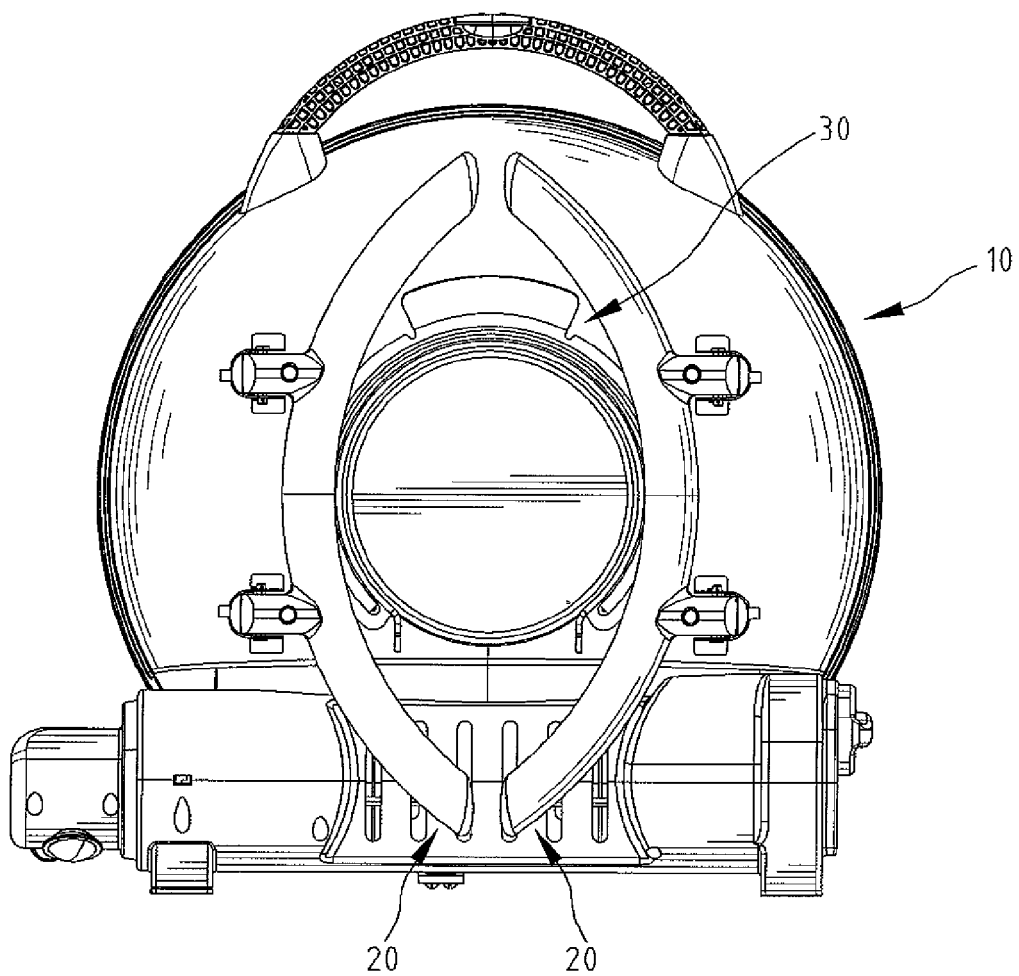
FIG. 3 is side view of the barbecue stove of FIG. 1.

Referring to FIGS. 1 through 3, a barbecue stove is round shaped and includes a body 10, a grease plate 30, a frame 12, a plurality of pivots 14 and two feet 20. The body 10 includes a hole 11 formed on the bottom of the body 10. The frame 12 is around the hole 11 of the body 10. A receive space 13 is formed between the frame 12 and the bottom of the body 10 for receiving the grease plate 30. The plurality of pivots 14 are fixed on the bottom of the body 10. The two feet 20 are pivotally connected with the pivots 14 individually.

The frame 12 is around the hole 11 of the body 10 and is similar to a U-shape. The frame 12 includes two ends 121, with both ends 121 secured to the same side of the bottom of the body 10 and with the frame 12 forming the receive space 13 for receiving the grease plate 30.

Each pivot 14 is consists of two L-shape holders 141. A gap is formed between the two holders 141 for receiving the foot 20. Each holder 141 includes a fixing section 142 and a holding section 143. The fixing section 142 is secured onto the bottom of the body 10. The holding section 143 includes an orifice 144, a first aperture 145 and a second aperture 146.

The feet 20 are pivotally connected with the pivots 14 individually. The feet 20 are arc-shaped. The ends of each foot 20 respectively form a flat 21 for stabilizing the body 10. Each foot 20 further includes two extensions 22. Each extension 22 includes an orifice 23 and an aperture 24.

A bolt 15 is inserted through the orifice 144 of the holder 141 and the orifice 23 of the extension 22 for securing the foot 20 with the holder 141. The bolt 15 includes a flange 151 and a transverse aperture 152. The flange 151 of the bolt 15 can abut against one side of the extension 22 and prevents the bolt 15 coming away from the holder 141. A latch 153 can be inserted into the transverse aperture 152 so as to prevent the bolt 15 from detachment with the extension 22.

An elastic member 25 is provided with two bent ends. Each bent end of the elastic member 25 includes a spherical stopper 251. The elastic member 25 is sat into the aperture 24 of the extension 22 and contact contacts with the pivot 14. Due to the spherical stopper 251, the stopper 251 can alternate against the first aperture 145 or the second aperture 146 of the pivot 14 easily.

The grease plate 30 includes a bent portion 31 with a flange 33. The flange 33 can increase the construction strength of the bent portion 31. The bent portion 31 is around the grease plate 30 and is similar to the U-shape of the frame 12 so that the grease plate 30 can be mounted on the frame 12 with the bent portion 31. A haft 32 is secured with the bent portion 31 of the grease plate 30 for helping the user operate the grease plate 30.

Figure 4:
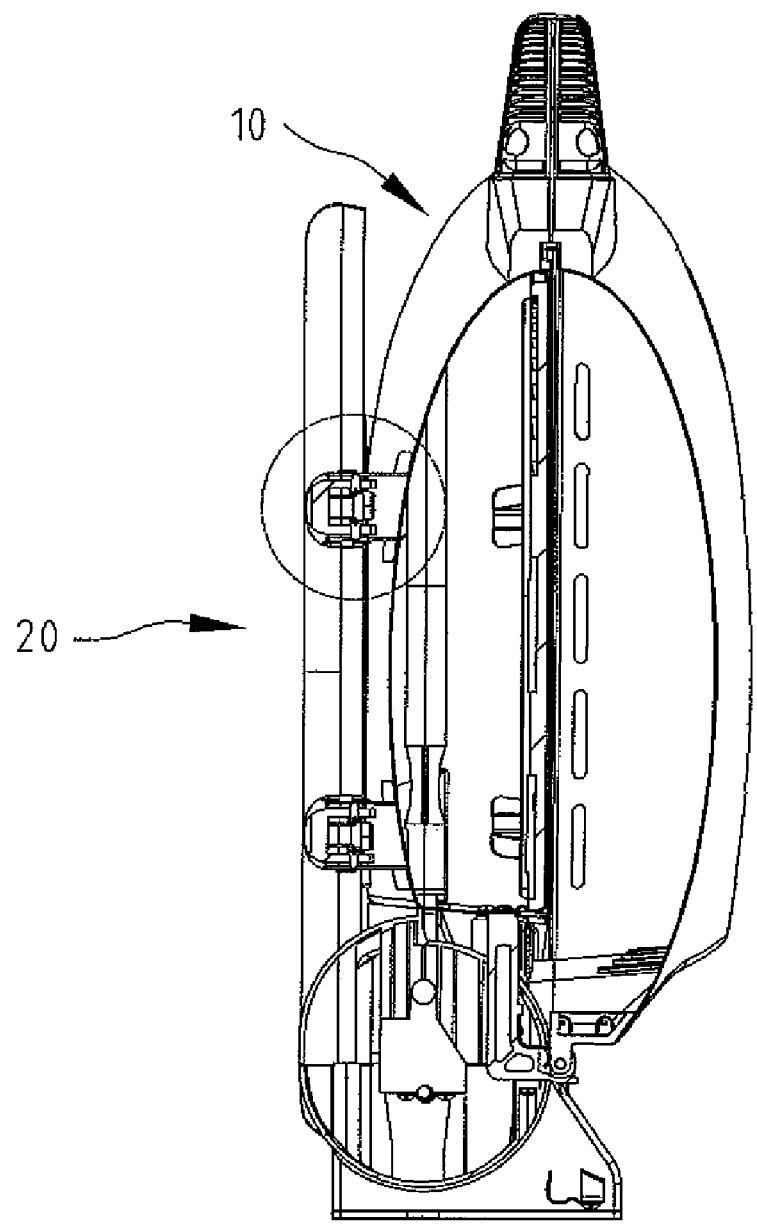
FIG. 4 is cross-sectional view of the barbecue stove taken along a line 4-4 shown in FIG. 1, with the feet folded.
Figure 5:
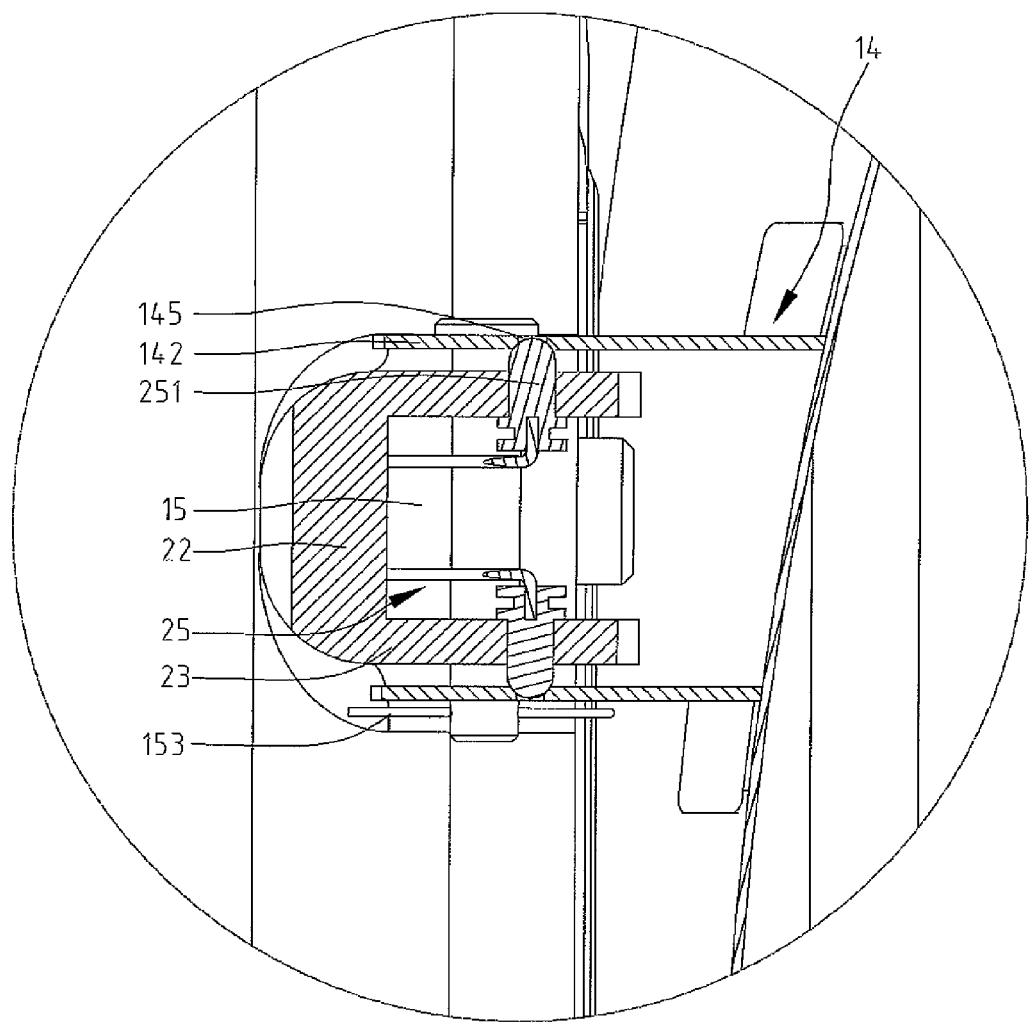
FIG. 5 is a partial cross-sectional view of the barbecue stove of FIG. 4.

FIGS. 3, 4 and 5 show the feet 20 of the barbecue stove in a folding condition. The grease plate 30 is locked between the bottom of the body 10 and the feet 20. Due to the elasticity of the elastic members 25, the stoppers 251 can abut against the first apertures 145 of the pivots 14 to hold the feet 20 in a folded condition.

Figure 6:
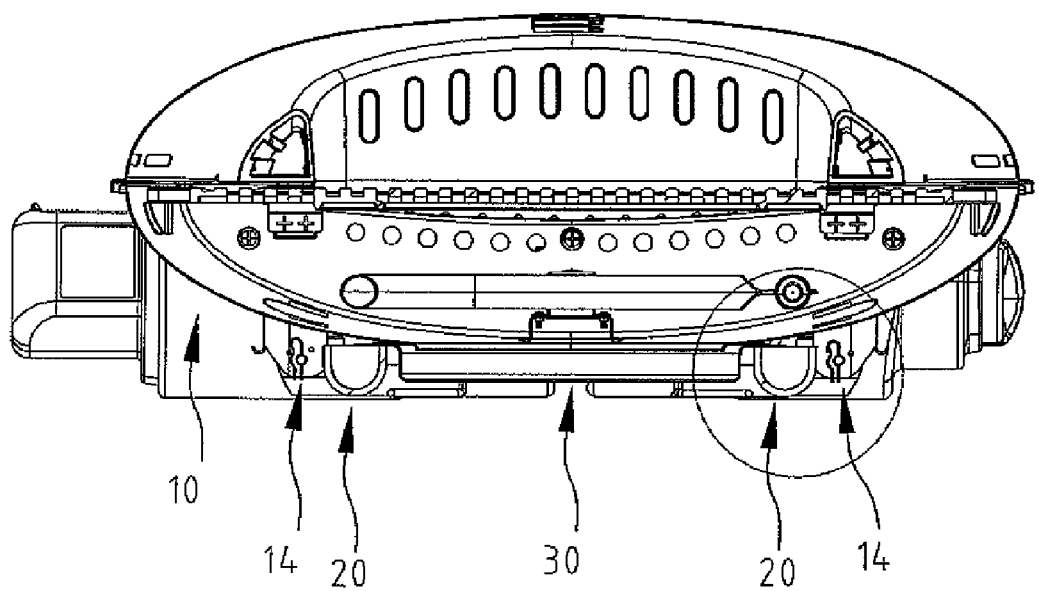
FIG. 6 is cross-sectional view of the barbecue stove taken along a line 6-6 shown in FIG. 1.
Figure 7:
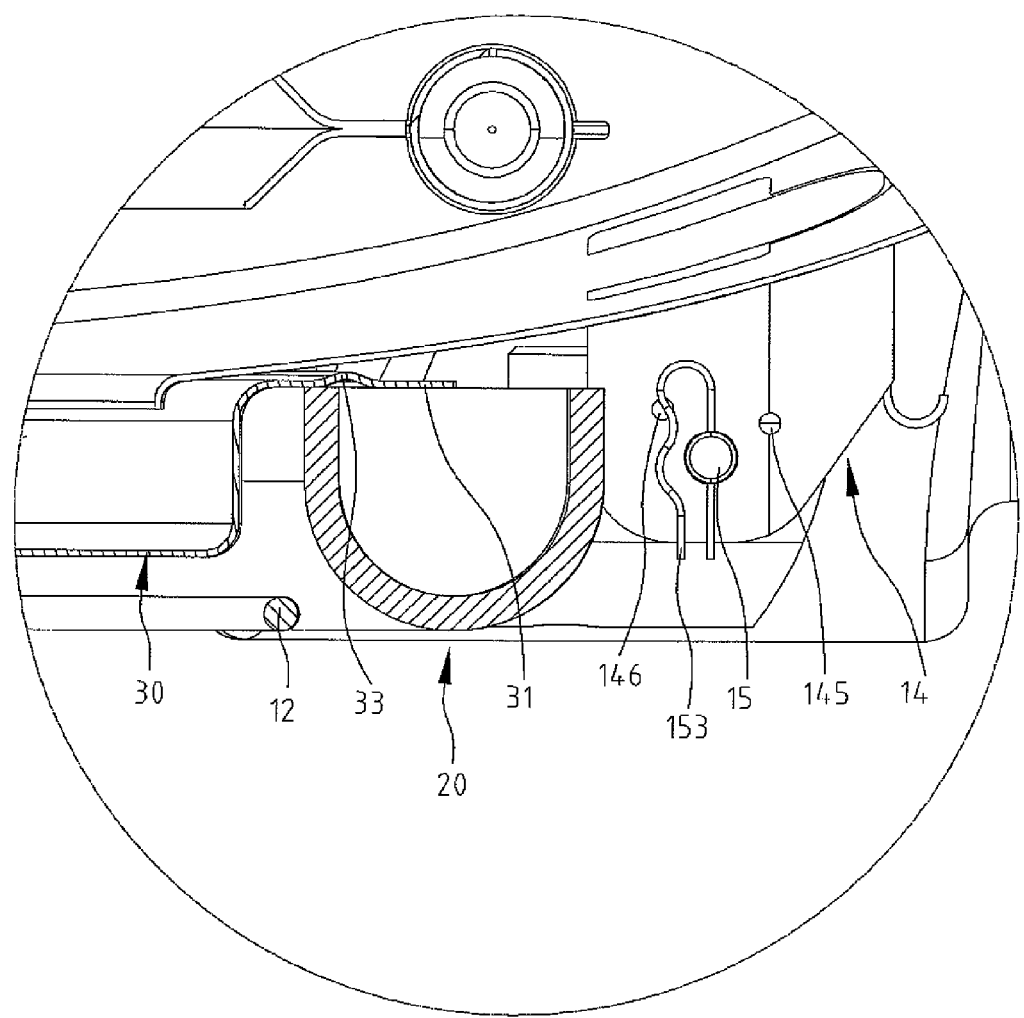
FIG. 7 is a partial enlarged view of the barbecue stove of FIG. 6.

FIGS. 6 and 7 show the grease plate 30 locked by the feet 20 in more detail. The bolt 15 is used for securing the pivot 14 and the extension 22 of the foot 20. The latch 153 is inserted into the transverse aperture 152 of the bolt 15 to prevent the extension 22 from coming away. The grease plate 30 is gripped between the bottom of the body 10 and the feet 20 closely to prevent the grease plate 30 coming away.

Figure 8:
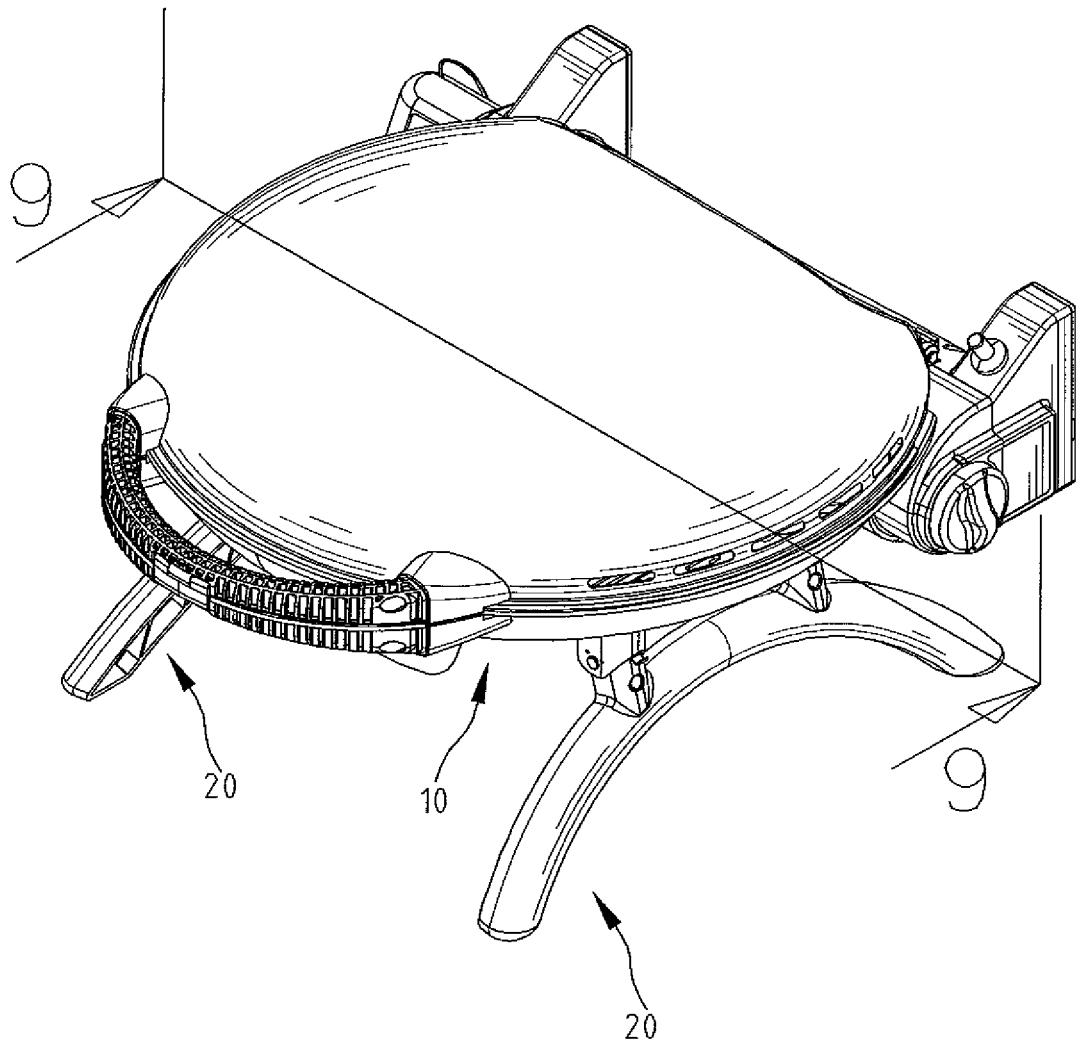
FIG. 8 is a perspective view of the barbecue stove, with the feet unfolded.
Figure 9:
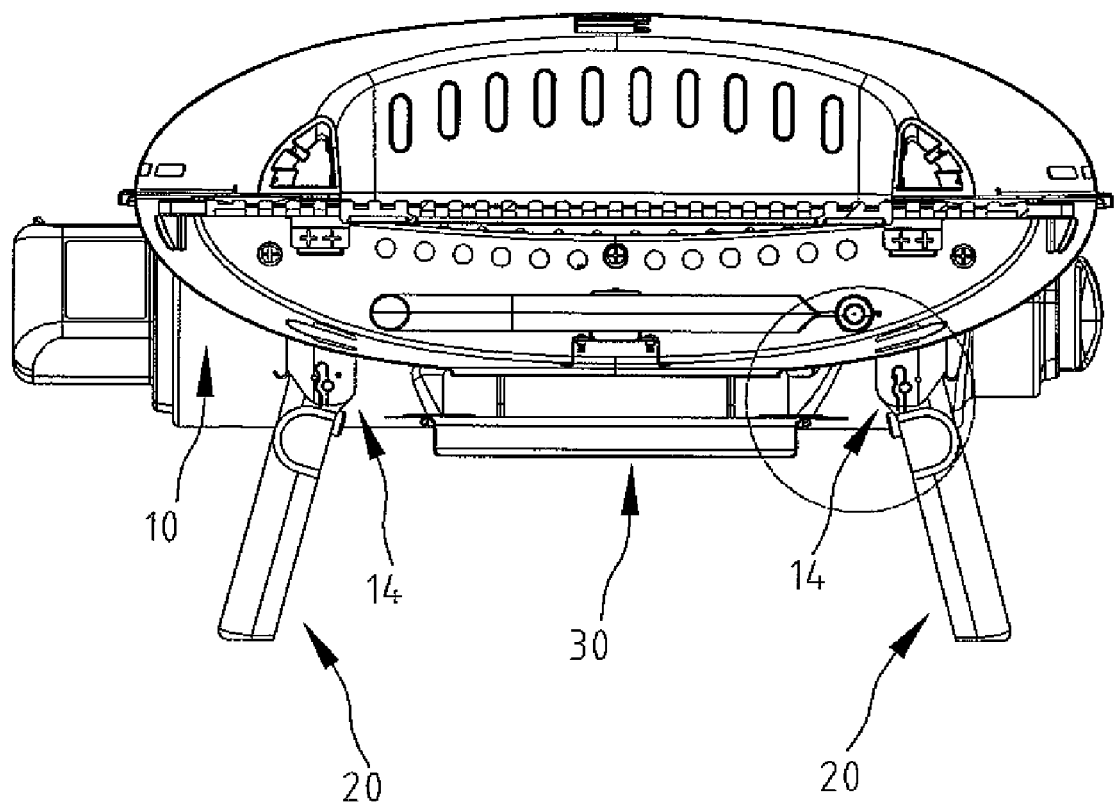
FIG. 9 is cross-sectional view of the barbecue stove taken along a line 9-9 shown in FIG. 8.
Figure 10:
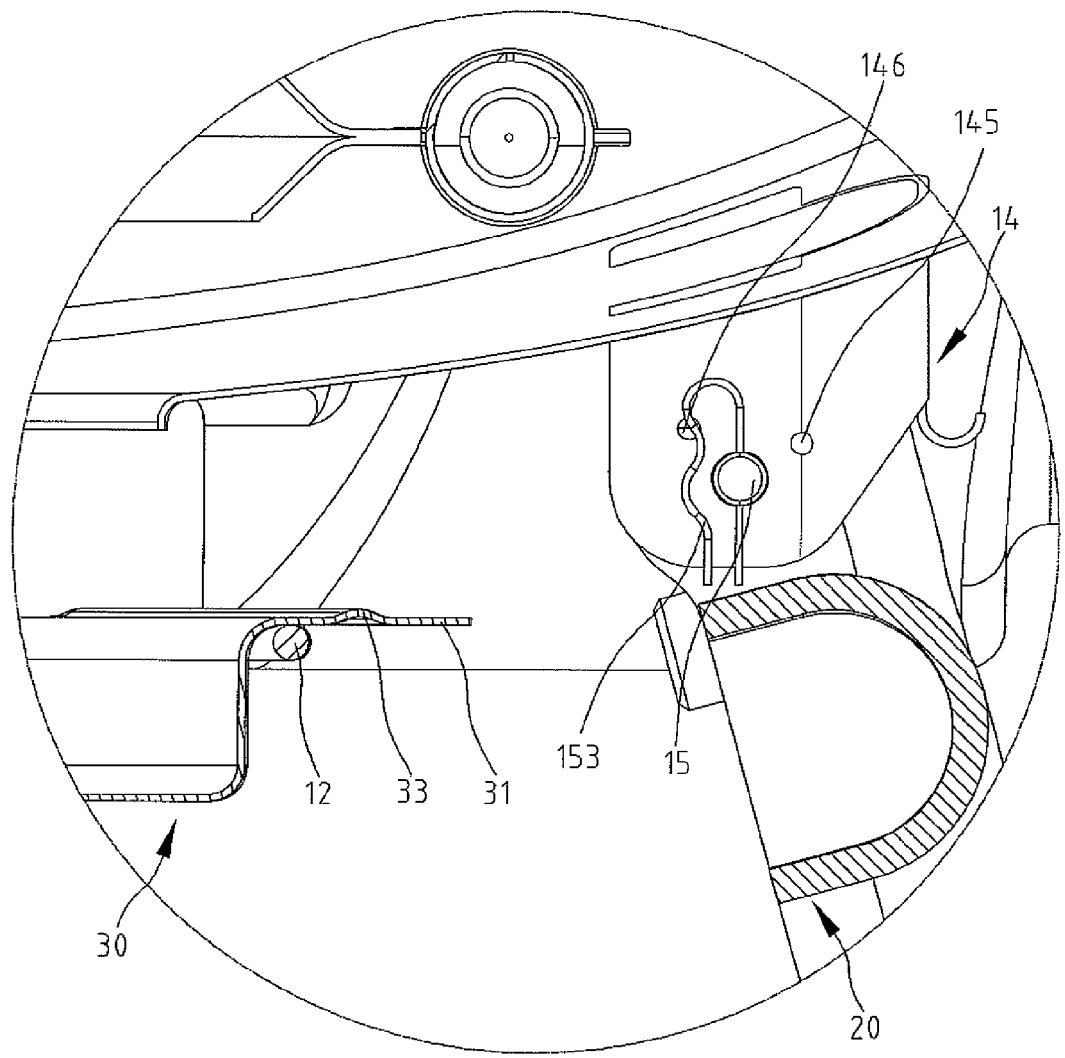
FIG. 10 is a partial enlarged view of the barbecue stove of FIG. 9.

FIGS. 8 to 10 show the feet 20 of the barbecue stove in an unfolding condition. When the feet 20 are opened, the stoppers 251 of the elastic members 25 are against the second apertures 146 of the pivots 14 so that the feet 20 are held in the unfolding condition. At the same time, the grease plate 30 is mounted onto the frame 12 by the bent portion 31 so that the user can move the grease plate 30 easily.

The holding construction of the barbecue stove according to the present invention exhibits advantages.

Firstly, the construction of the frame 12 is suitable for operating.

Secondly, the grease plate 30 can be gripped between the feet 20 and the bottom of the body 10 for preventing the grease plate 30 from coming away.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A holding construction of a barbecue stove comprising:
a body comprising a hole on the bottom of the body;
a grease plate comprising a bent portion;
a frame extending around the hole of the body and secured with the body, with the frame slideably receiving the bent portion of the grease plate;
a plurality of pivots fixed on the bottom of the body on opposite sides of the hole; and
two feet individually pivotally connected with the plurality of pivots;
wherein each of the two feet are pivotal between an unfolding condition extending away from the bottom of the body for supporting the body and a folding condition, wherein the grease plate is disposed on the frame and spaced from the bottom of the body to define a gap between the grease plate and the bottom of the body when the two feet are in the unfolding condition, with the two feet in the folding condition gripping the bent portion of the grease plate resulting in the grease plate being supported on the feet and sandwiched between the body and the two feet and being spaced from the frame.

2. The holding construction of a barbecue stove according to claim 1 wherein the frame comprises two bent ends secured onto a same side of the bottom of the body for holding the grease plate.

3. The holding construction of a barbecue stove according to claim 1 wherein the bent portion of the grease plate partially extends around the grease plate.

4. The holding construction of a barbecue stove according to claim 1 wherein the bent portion of the grease plate comprises a haft for helping the user slide the grease plate.

5. The holding construction of a barbecue stove according to claim 1 further comprising a flange extending from the bent portion of the grease plate towards the bottom of the body when the bent portion is slideably received between the frame and the bottom of the body for increasing the construction strength of the bent portion.

6. The holding construction of a barbecue stove according to claim 1 wherein each foot comprises two extensions individually pivotally connected with one of the plurality of pivots.

7. The holding construction of a barbecue stove according to claim 6 wherein each of the two feet is connected with one of the plurality of pivots by a bolt, with the two feet held in the folding or unfolding condition by an elastic member.

8. The holding construction of a barbecue stove according to claim 7 wherein each of the plurality of pivots comprises an orifice, a first aperture and a second aperture, wherein the extension of the foot comprises an orifice and an aperture, wherein the orifice of the plurality of pivots and the orifice of the extensions is communicated by the bolt, and the elastic member is sat into the aperture of the extension for contact with the first aperture or the second aperture of the pivot.

9. The holding construction of a barbecue stove according to claim 7 wherein the elastic member is of a U-shape, with each bent end of the elastic member comprising a spherical stopper.

10. The holding construction of a barbecue stove according to claim 7 wherein the bolt comprises a latch and a transverse aperture, with the latch matching with the transverse aperture to prevent the bolt from coming away.

* * * * *